(12) United States Patent
Ono et al.

(10) Patent No.: US 12,539,790 B2
(45) Date of Patent: Feb. 3, 2026

(54) VEHICLE SEAT

(71) Applicant: DELTA KOGYO CO., LTD., Hiroshima (JP)

(72) Inventors: Hiroaki Ono, Hiroshima (JP); Masaru Fujihara, Hiroshima (JP); Daisuke Komoda, Hiroshima (JP); Toshihiko Tomita, Hiroshima (JP); Noritoshi Kobayashi, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 185 days.

(21) Appl. No.: 18/567,899

(22) PCT Filed: Jun. 16, 2022

(86) PCT No.: PCT/JP2022/024065
§ 371 (c)(1),
(2) Date: Dec. 7, 2023

(87) PCT Pub. No.: WO2022/270395
PCT Pub. Date: Dec. 29, 2022

(65) Prior Publication Data
US 2024/0262262 A1     Aug. 8, 2024

(30) Foreign Application Priority Data

Jun. 23, 2021   (JP) .................. 2021-104127

(51) Int. Cl.
*B60N 2/16* (2006.01)
*B60N 2/42* (2006.01)
(52) U.S. Cl.
CPC ......... *B60N 2/1615* (2013.01); *B60N 2/4228* (2013.01)
(58) Field of Classification Search
CPC .............. B60N 2/1615; B60N 2/4228
See application file for complete search history.

(56) References Cited

U.S. PATENT DOCUMENTS 6,176,543 B1   1/2001   Nawata et al.
6,276,650 B1   8/2001   Kojima et al.
(Continued)

FOREIGN PATENT DOCUMENTS

DE   102011107596 A1   1/2013
JP   H01-136030 U      9/1989
(Continued)

OTHER PUBLICATIONS

Extended European Search Report issued in EP 22 82 8312.3-1009 by the European Patent Office on Oct. 8, 2024, which is related to U.S. Appl. No. 18/567,899.

(Continued)

*Primary Examiner* — Anthony D Barfield
(74) *Attorney, Agent, or Firm* — Studebaker Brackett PLLC

(57) ABSTRACT

Provided is a vehicle seat prevented from rearward tilting thereof at a rear collision and prevented from an increase in the seat weight. The vehicle seat includes a link mechanism configured to adjust a height of a seat cushion. The link mechanism includes: an attachment bracket to be attached to a floor of a vehicle compartment; link arms linking a cushion frame and the attachment bracket to each other in such a manner that the cushion frame is shiftable between a first position and a second position located downward and vehicular rearward of the first position in parallel to the attachment bracket; and a protrusion integrally formed with the attachment bracket and protruding upward from an upper surface of the attachment bracket, and having a contact surface that comes into contact with a bumping section of the cushion frame thereon when a vehicle is involved in the rear collision.

9 Claims, 13 Drawing Sheets

(56) References Cited

U.S. PATENT DOCUMENTS

2013/0038098 A1    2/2013   Maier
2013/0278030 A1   10/2013   Munemura et al.
2014/0339863 A1   11/2014   Eckhoff et al.

FOREIGN PATENT DOCUMENTS

| | | |
|---|---|---|
| JP | H11-115594 A | 4/1999 |
| JP | 2000-094998 A | 4/2000 |
| JP | 2009-208737 A | 9/2009 |
| JP | 2012-148721 A | 8/2012 |
| JP | 2013-112231 A | 6/2013 |
| JP | 2013-220784 A | 10/2013 |
| JP | 2015-003582 A | 1/2015 |
| JP | 5873186 B2 | 3/2016 |
| KR | 10-2009-0052563 A | 5/2009 |

OTHER PUBLICATIONS

International Search Report issued in PCT/JP2022/024065; mailed Sep. 6, 2022.
"Notice of Reasons for Refusal" Office Action issued in JP 2021-104127; mailed by the Japanese Patent Office on Feb. 4, 2025.

FIG.10A
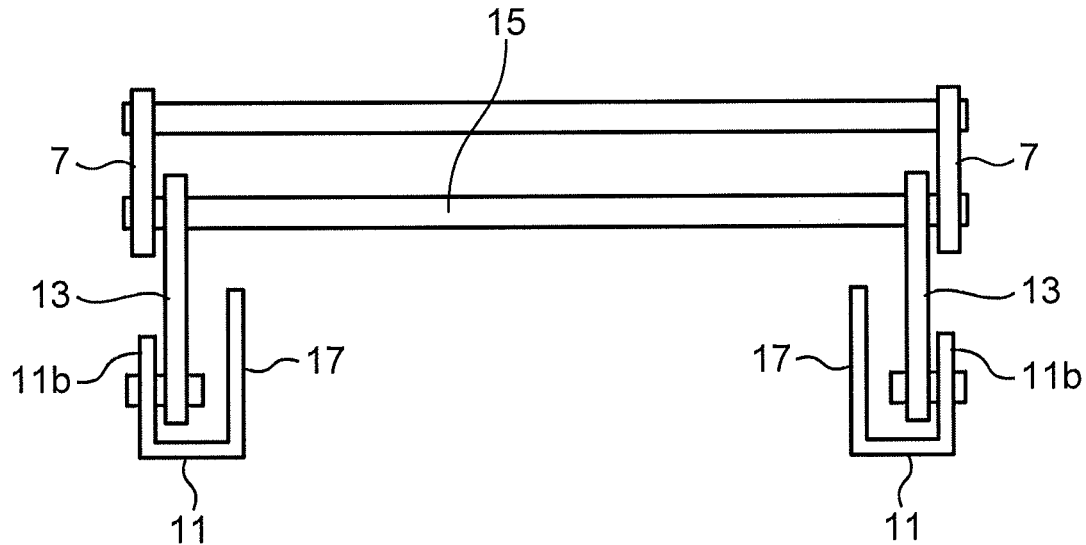
FIG.10B
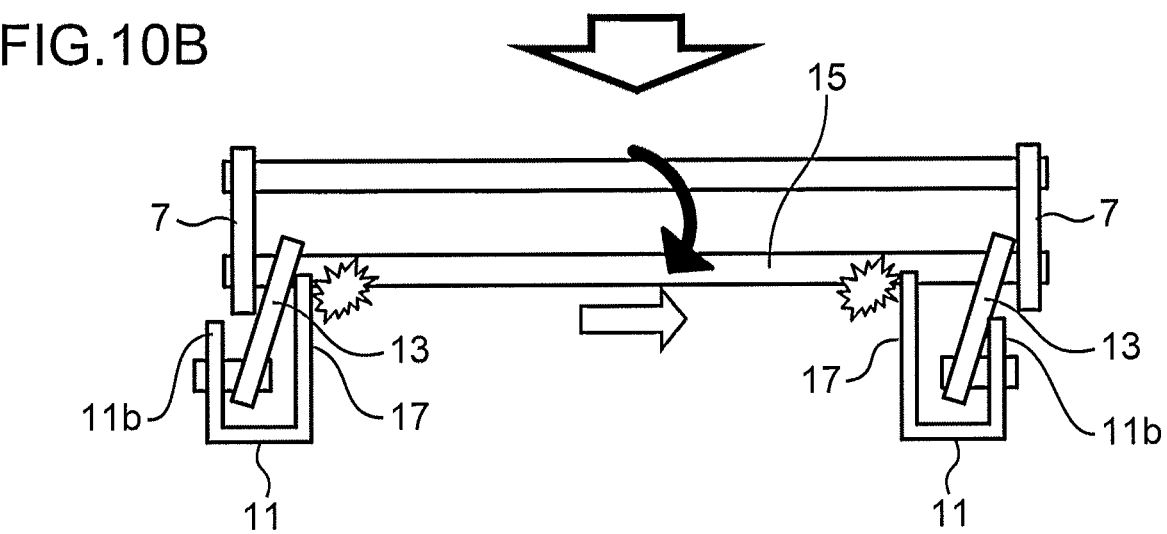
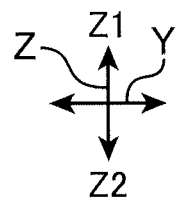

VEHICLE SEAT

TECHNICAL FIELD

The present invention relates to a vehicle seat.

BACKGROUND ART

A conventional vehicle seat includes a link mechanism which adjusts a height of the seat. Such a seat has a possibility that, when a vehicle is involved in a collision to a rear portion thereof from a following vehicle, a sitting person is relatively moved vehicular rearward in the vehicle in accordance with inertia, a link arm of the link mechanism rotates vehicular rearward by a force of the inertia accompanied by the movement, and that an angle of the link arm tilting vehicular rearward increases. In this case, the increase in the tilt angle of the link arm may bring the seat into contact with an occupant sitting on a rear seat.

A seat described in Patent Literature 1 includes: a stop body provided to a seat link (link arm) of a vehicle seat; and a stop element contactable with the stop body at rearward tilting of the seat link to prevent the seat from tilting rearward when a vehicle is involved in a rear collision. The stop element is screwed to an upper seat rail in the rear of the seat link on the upper seat rail. When the vehicle is involved in the rear collision, the stop element attached to the upper seat rail comes into contact with the stop body of the seat link to suppress the rearward tilting of the seat at the rear collision.

The seat structure described above requires attachment of such a special member as the stop element to the upper seat rail in addition to the link mechanism to prevent the seat from tilting rearward. The stop element further needs an enough strength to endure a load applied on contact with the stop body of the seat link at the vehicle collision. This leads to a concern about an increase in the weight of the entire seat.

CITATION LIST

Patent Literature

Patent Literature 1: Japanese Patent Publication Number 5873186

SUMMARY OF INVENTION

The present invention has been achieved in consideration of the circumstances described above, and has an object of providing a vehicle seat that can be prevented from rearward tilting thereof at a rear collision and prevented from an increase in the weight of the seat.

A vehicle seat of the present invention includes: a seat cushion; and a link mechanism configured to adjust a height of the seat cushion. The link mechanism includes: a cushion frame that supports the seat cushion; an attachment bracket to be directly or indirectly attached to a floor of a vehicle compartment; a plurality of link arms linking the cushion frame and the attachment bracket to each other in such a manner that the cushion frame is shiftable between a first position and a second position located downward and vehicular rearward of the first position in parallel to the attachment bracket; and a protrusion integrally formed with the attachment bracket and protruding upward from an upper surface of the attachment bracket, and having a contact surface that comes into contact with a bumping section constituting a part of the cushion frame thereon when a vehicle is involved in a rear collision.

BRIEF DESCRIPTION OF DRAWINGS

FIGS. 10A and 10B are schematic views showing the position relation among the pair of protrusions, the crossbar, and the rear link arm, wherein FIG. 10A is a schematic view in a state before the vehicle is involved in the rear collision and FIG. 10B is a schematic view in a state after the rear collision of the vehicle.

DESCRIPTION OF EMBODIMENTS

Hereinafter, a preferable embodiment of the present invention will be described with reference to the accompanying drawings.

Figure 1:
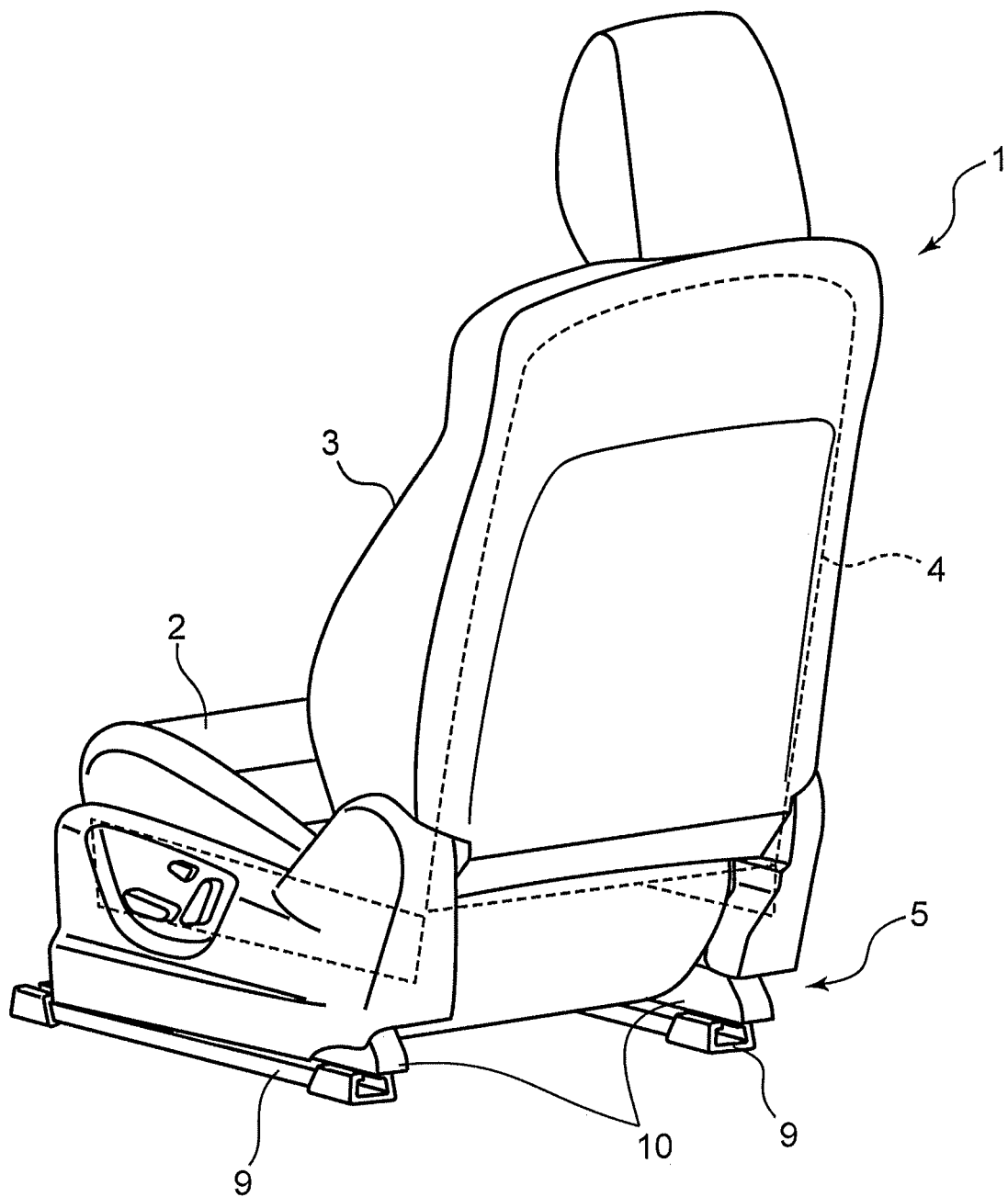
FIG. 1 is a perspective and obliquely rearward view of an overall configuration of a seat according to an embodiment of the present invention.
Figure 2:
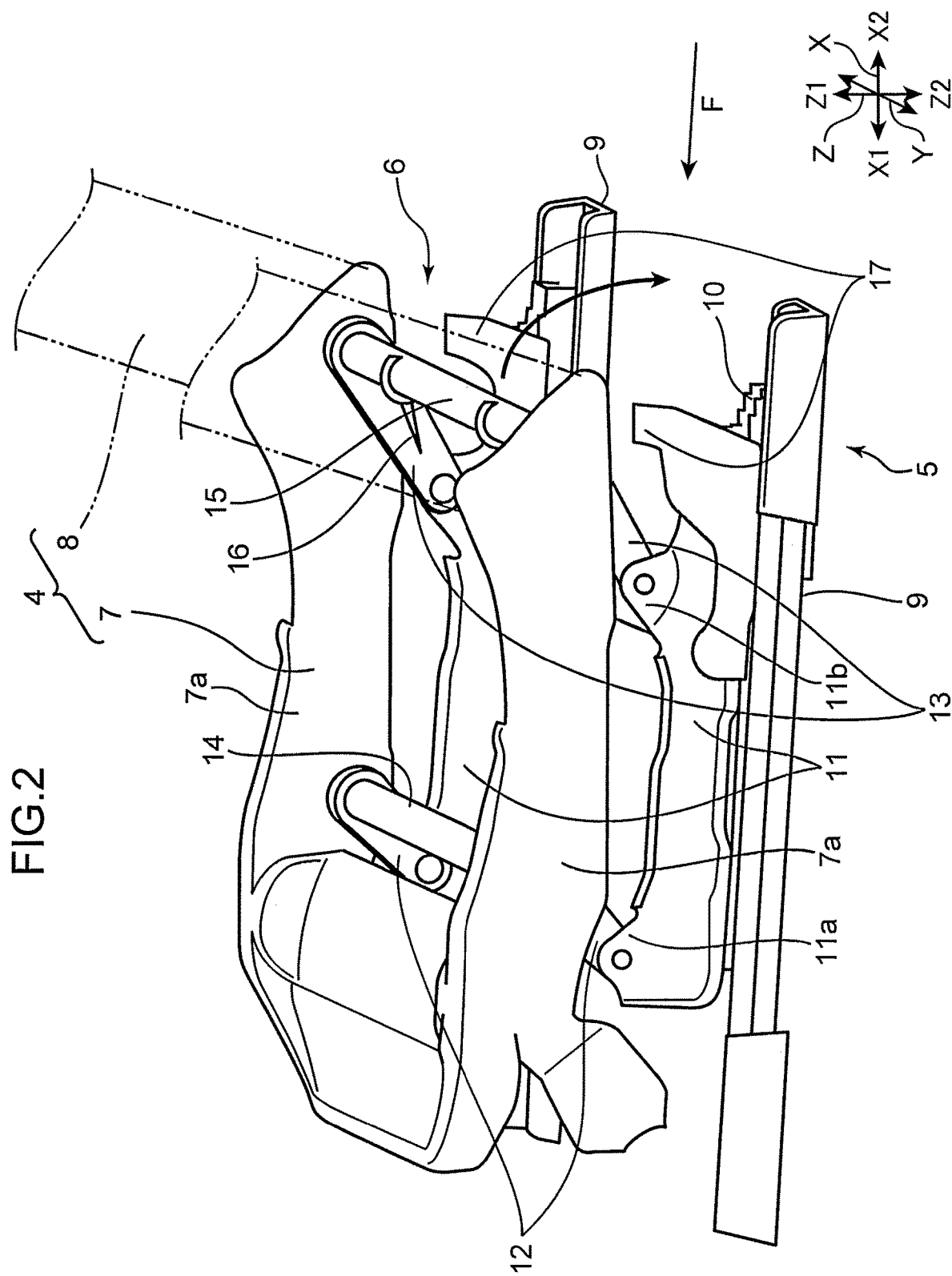
FIG. 2 is a perspective explanatory view of a guide rail and a link mechanism included in the seat in FIG. 1.
Figure 3:
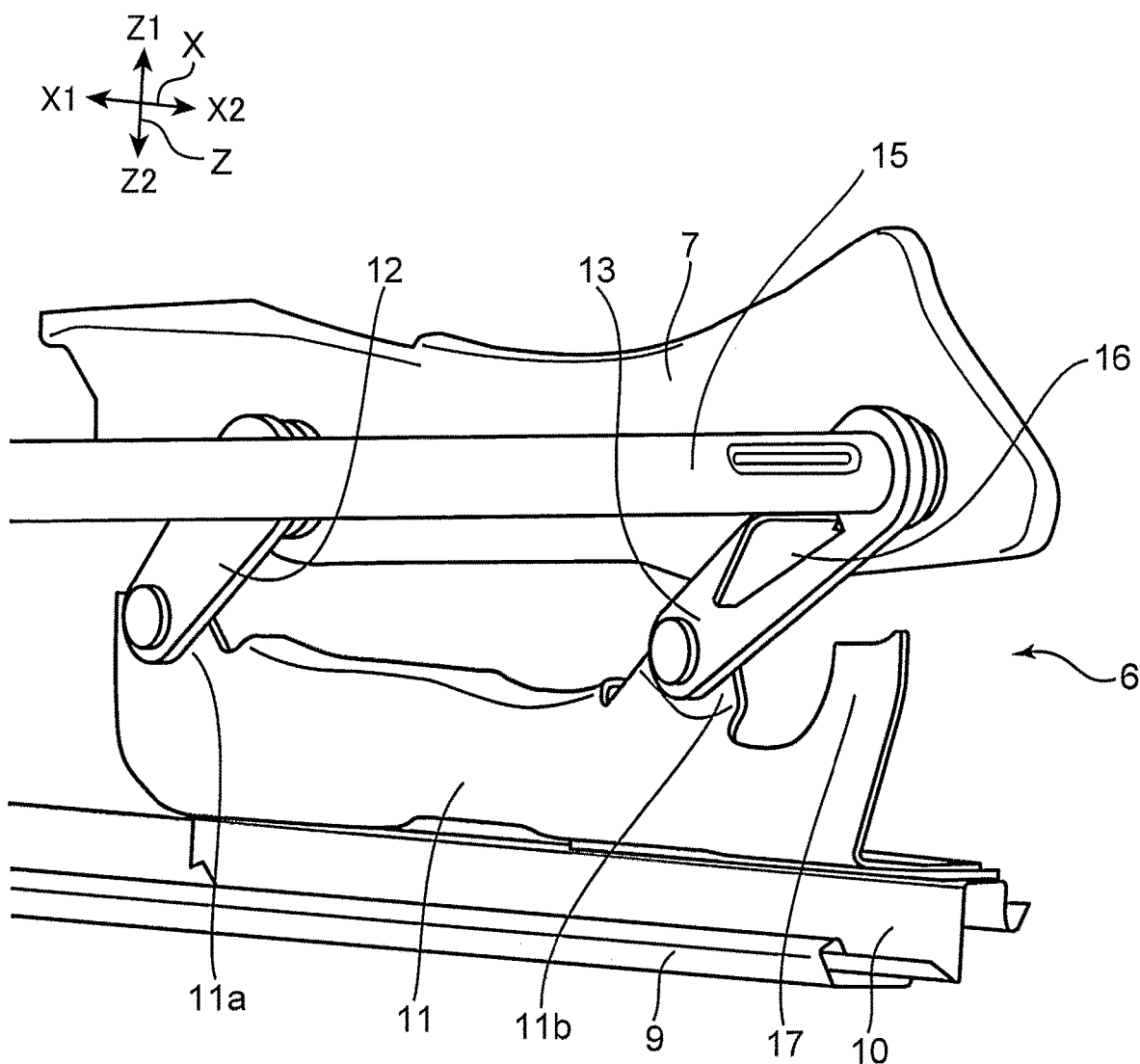
FIG. 3 is a perspective explanatory view of a cushion frame, an attachment bracket, a rear crossbar, and front and rear link arms, each included in the link mechanism in FIG. 2.

As shown in FIG. 1 to FIG. 2, a vehicle seat 1 (hereinafter, referred to as a "seat 1") in the embodiment is directed to a seat to be attached to a vehicle compartment of a vehicle, and includes a seat cushion 2 contactable with the buttocks of a sitting person, and a link mechanism 6 configured to adjust a height of the seat cushion 2.

Specifically, the seat 1 includes: the seat cushion 2: a seatback 3 contactable with the back of the sitting person; a seat frame 4; a guide rail 5; and the link mechanism 6.

The seat frame 4 includes a cushion frame 7 that supports the seat cushion 2 from below, and a back frame 8 that supports the seatback 3 in a standing state from rear. The cushion frame 7 has a pair of side parts 7a spaced apart from each other on both sides of the seat 1 in a width direction Y and extending in a vehicular frontward and rearward direction X. The seat frame 4 and the link mechanism 6 share the cushion frame 7.

The guide rail 5 includes a pair of lower rails 9 extending in the vehicular frontward and rearward direction X and spaced apart from each other to be fixedly attached to a floor surface of the vehicle compartment, and a pair of upper rails 10 slidably guided in the vehicular frontward and rearward direction X by the pair of lower rails 9.

As shown in FIG. 2 to FIG. 5, the link mechanism 6 includes: the cushion frame 7; a pair of attachment brackets 11 located downward Z2 of the pair of side parts 7a of the cushion frame 7; and a plurality of link arms, specifically, a pair of front link arms 12 and a pair of rear link arms 13. In the embodiment, the link mechanism 6 further includes a front crossbar 14 and a rear crossbar 15 constituting a part of the cushion frame 7. Each of the pair of rear link arms 13 includes a reinforcement plate member 16 for reinforcement across the rear crossbar 15. The pair of attachment brackets 11 include a pair of protrusions 17 that are contactable with the rear crossbar 15 when the vehicle is involved in a rear collision (when a load F is applied to each of the attachment brackets 11 from a rearward X2 position as shown in FIG. 2).

Figure 7:
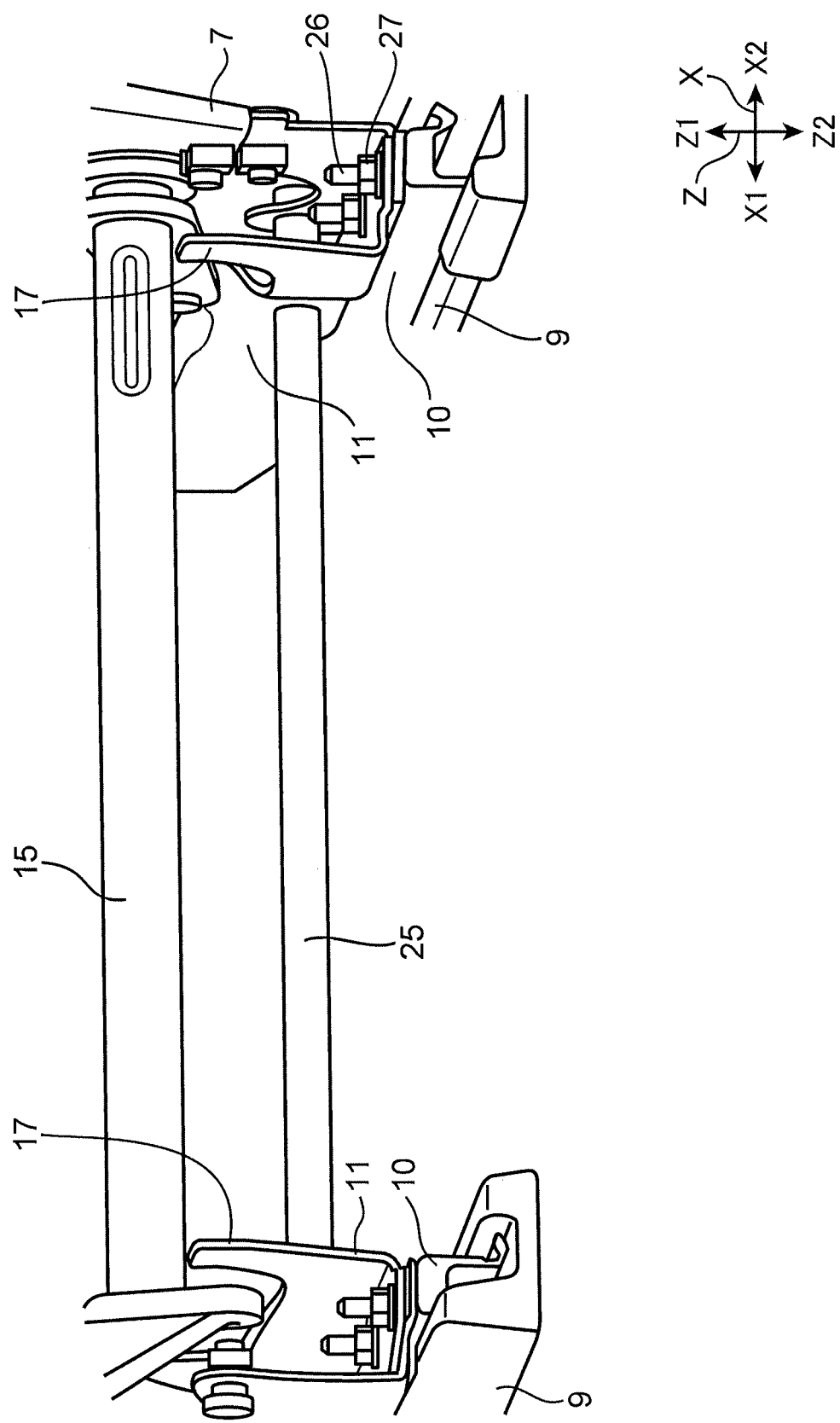
FIG. 7 is a perspective explanatory view showing a state before a vehicle is involved in a rear collision and where the cushion frame is in a second position downward and the crossbar in FIG. 2 is in no contact with the protrusion of the attachment bracket in FIG. 2.
Figure 8:
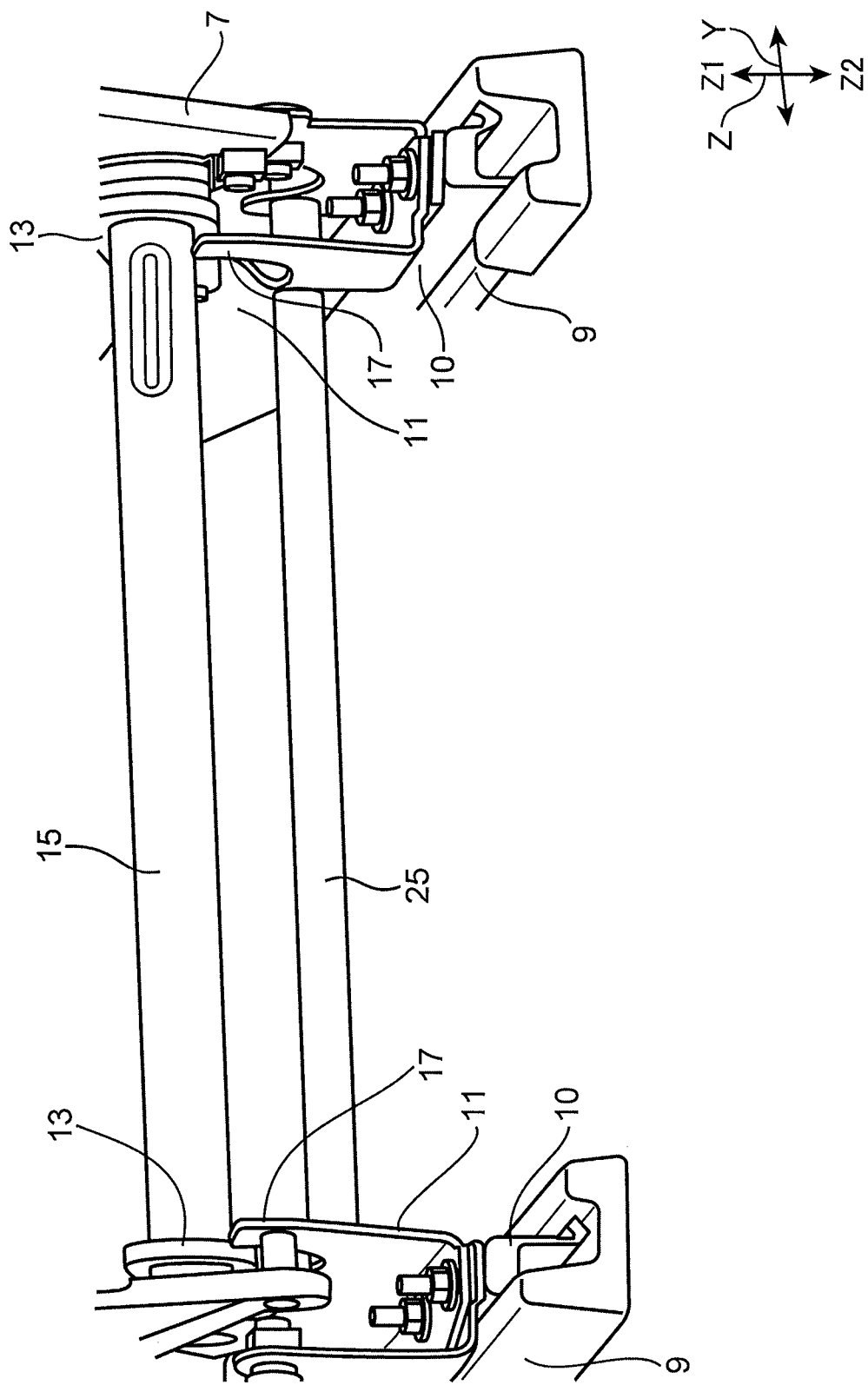
FIG. 8 is a perspective explanatory view showing a state where the vehicle is involved in the rear collision and the crossbar in FIG. 2 is in contact with the protrusion of the attachment bracket.

The pair of attachment brackets 11 are directly or indirectly attached to the floor of the vehicle compartment. In the embodiment, the pair of attachment brackets 11 are fastened to the pair of upper rails 10 of the guide rail 5 by bolts, e.g., stud bolts 26 and nuts 27 on an upper surface of each upper rail 10 in FIG. 7. In other words, the attachment brackets 11 are indirectly attached to the floor of the vehicle compartment via the guide rail 5. Each attachment bracket 11 is made of material having high stiffness, such as steel. In the embodiment, as shown in FIG. 7 to FIG. 8, the pair of attachment brackets 11 are connected to each other by a lower crossbar 25 to improve the stiffness of the attachment brackets 11.

The plurality of link arms, namely, the pair of front link arms 12 and the pair of rear link arms 13, link the cushion frame 7 and the attachment brackets 11 to each other in such a manner that the cushion frame 7 is shiftable between a first position (upward Z1 position of the cushion frame 7 in FIG. 2) and a second position (see FIG. 2 to FIG. 7) located downward Z2 and vehicular rearward X2 of the first position in parallel to the attachment brackets 11. Specifically, the pair of front link arms 12 have: their respective lower ends supported by respective front support parts 11a of the pair of attachment brackets 11 rotatably about a rotation pin C1 serving as a rotation central axis; and their respective upper ends rotatably connected to the pair of side parts 7a of the cushion frame 7 via the front crossbar 14. Similarly, the pair of rear link arms 13 have: their respective lower ends supported by respective rear support parts 11b of the pair of attachment brackets 11 rotatably about a rotation pin C2 serving as a rotation central axis; and their respective upper ends rotatably connected to the pair of side parts 7a of the cushion frame 7 via the rear crossbar 15.

That is to say, in the embodiment, the front crossbar 14 rotatably supports the pair of front link arms 12 on both sides of the seat 1 in the width direction Y. Similarly, the rear crossbar 15 rotatably supports the pair of rear link arms 13 on both sides of the seat 1 in the width direction Y.

The front crossbar 14 and the rear crossbar 15 constituting a part of the cushion frame 7 extend in the width direction Y of the seat 1 and are spaced apart from each other in the vehicular frontward and rearward direction X. Each of the front crossbar 14 and the rear crossbar 15 has opposite ends respectively fixed to the pair of side parts 7a of the cushion frame 7.

In the embodiment, the rear crossbar 15 serves as a bumping section contactable with the pair of protrusions 17.

The reinforcement plate member 16 is fixed to a connection portion of the rear link arm 13 and the rear crossbar 15 by welding or another way to reinforce the rear link arm 13.

Figure 4:
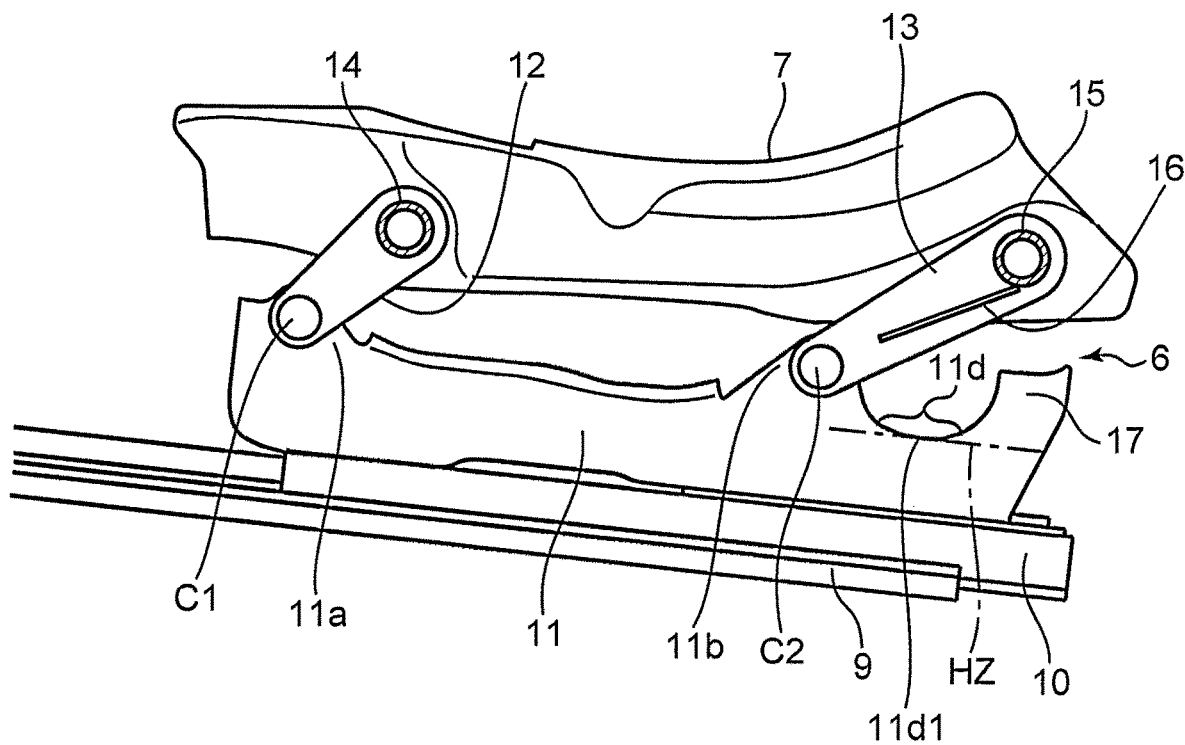
FIG. 4 is a side view of the cushion frame, the attachment bracket, the rear crossbar, and the front and rear link arms, each included in the link mechanism in FIG. 2.
Figure 5:
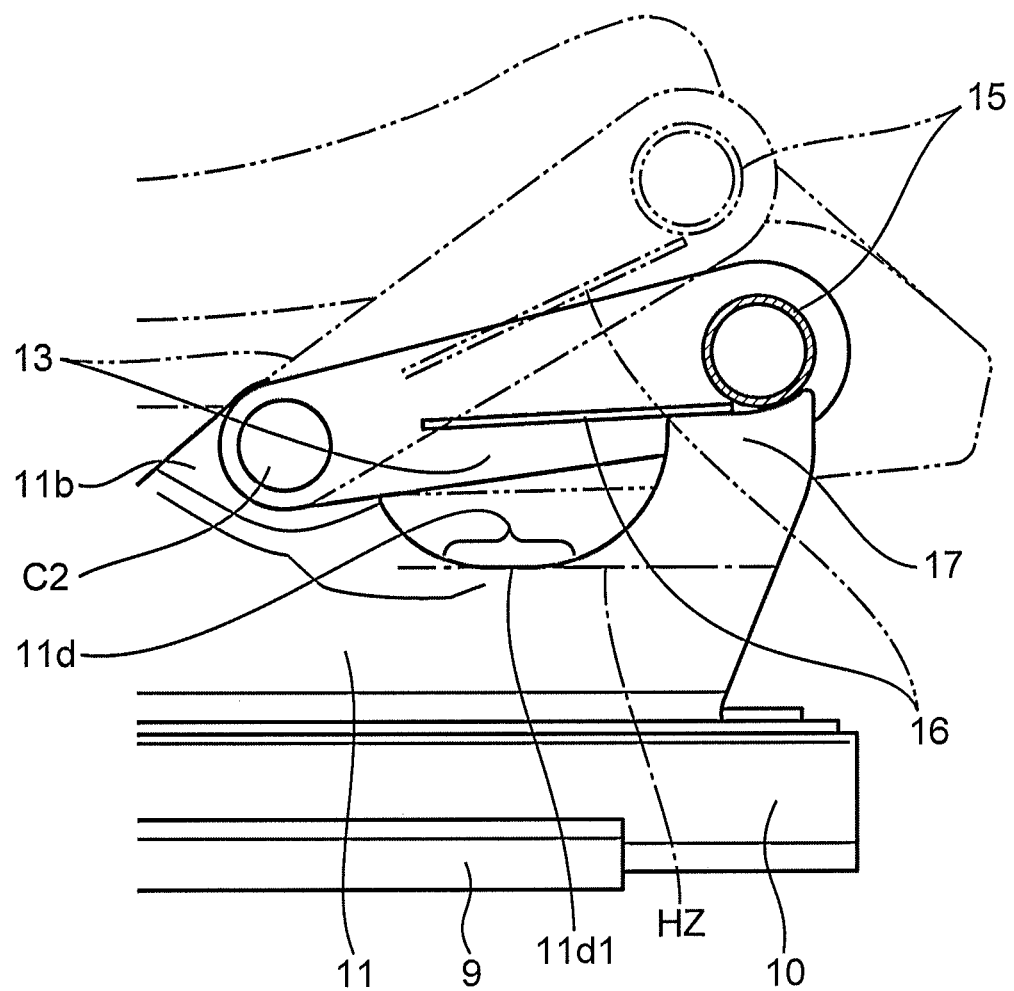
FIG. 5 is an enlarged view of a protrusion of the attachment bracket, the rear crossbar, and the rear link arm in FIG. 4.
Figure 6:
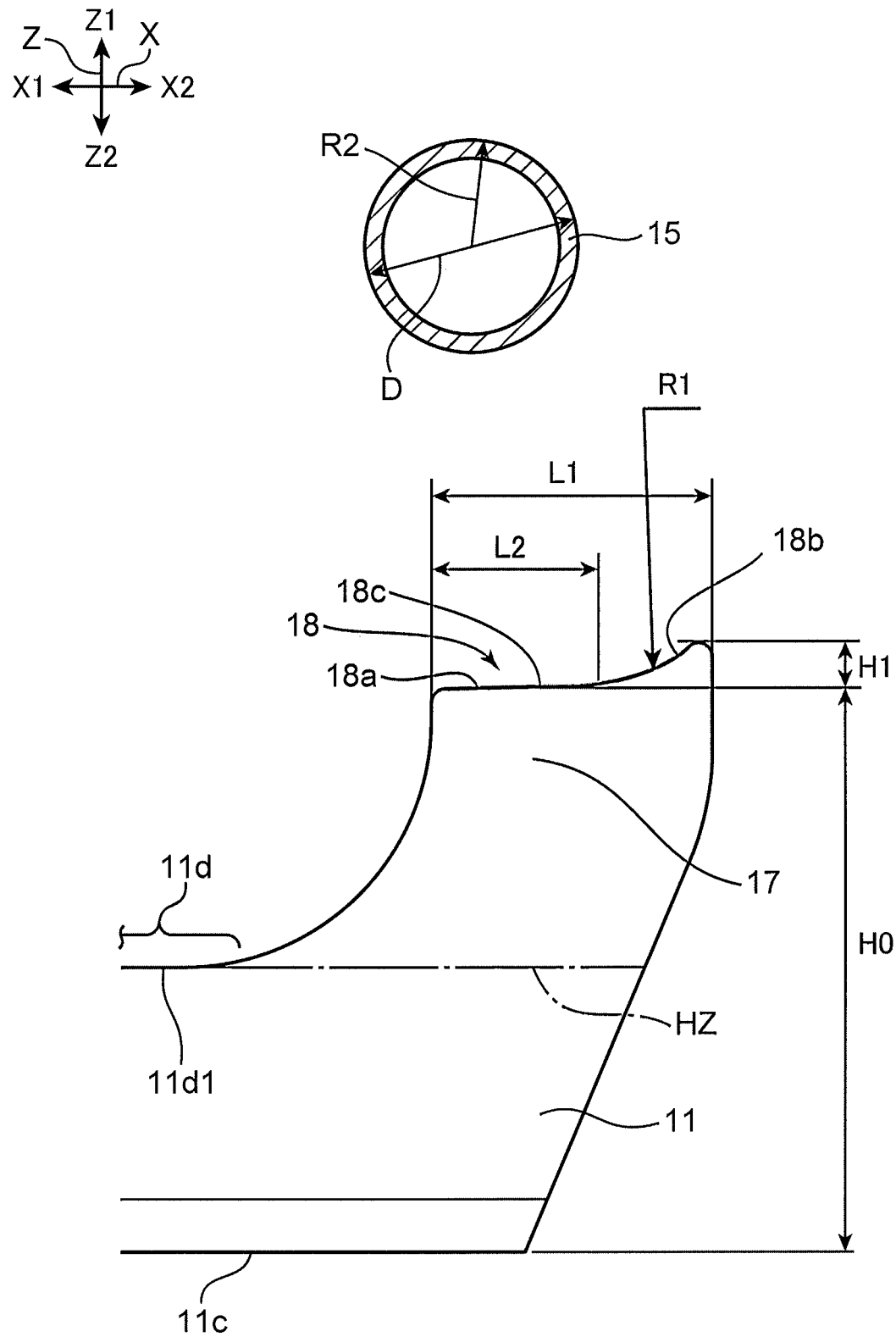
FIG. 6 is an explanatory view showing a dimension of each of the protrusion of the attachment bracket and the rear crossbar in FIG. 5.

Each protrusion 17 is integrally formed with the corresponding attachment bracket 11 and protrudes upward Z1 from an upper surface 11d of the attachment bracket 11 as shown in FIG. 2 to FIG. 6, in particular, FIG. 5 to FIG. 6. The protrusion 17 has a contact surface 18 contactable with the rear crossbar 15 thereon when the vehicle is involved in a rear collision. As shown in FIG. 4 to FIG. 6, the upper surface 11d of the attachment bracket 11 faces upward Z1 and includes a horizontal plane 11dl on a horizontal line HZ.

In the embodiment, the protrusion 17 protrudes upward Z1 from the upper surface 11d of the attachment bracket 11 at a rearward X2 position of the rear support part 11b of the attachment bracket 11. Hence, the rear crossbar 15 is contactable with the protrusion 17 when the rear crossbar 15 shifts vehicular rearward X2 and downward Z2 at the rear collision of the vehicle.

In the embodiment, the pair of protrusions 17 are provided and spaced apart from each other in the width direction Y of the seat 1 as shown in FIG. 2, FIG. 7 to FIG. 8, FIG. 10A, and FIG. 10B. The pair of protrusions 17 fall within an inner range of the cushion frame 7 in the width direction Y.

The contact surface 18 shown in FIG. 6 has such a height H0 and a length L1 in the vehicular frontward and rearward direction X as to make sure to bring the rear crossbar 15 into contact with the contact surface 18 of the protrusion 17 regardless of a variation in lowered positions at a rear collision of the vehicle.

For instance, as shown in FIG. 6, the height H0 of the contact surface 18, specifically, the height from a lower surface 11c to the contact surface 18 of the attachment bracket 11, is set in such a manner that the contact surface 18 is near to the rear crossbar 15 serving as the bumping section in the state where the cushion frame 8 is in the second position. Specifically, the height H0 of the contact surface 18 is set in such a manner as to define a gap between the contact surface 18 and the rear crossbar 15 in the state where the cushion frame 7 is in the second position. The setting of the height H0 of the contact surface 18 in this manner allows the contact surface 18 and the rear crossbar 15 come into contact with each other, and enables regulation of a tilt angle of the rear link arm 13 at the rear collision of the vehicle. The height H0 of the contact surface 18 is appropriately set to meet various conditions, such as a distance between the cushion frame 7 in the second position and the attachment bracket 11, a length of the rear link arm 13, and a position of the rear crossbar 15.

In the embodiment, the contact surface 18 of the protrusion 17 has such a length L1 in the vehicular frontward and rearward direction X as to come into contact with the rear crossbar 15 and the reinforcement plate member 16 at the same time. For instance, when the rear crossbar 15 has an outer diameter D of 25 mm, the length L1 of the contact surface 18 is set to 30 to 35 mm (around 33 mm). Further, the contact surface 18 has a front portion 18a including a front end and having a planar shape. A total length L2 of the front portion 18a and an intermediate portion 18c which gently slants is set to around 15 to 25 mm (around 20 mm).

The protrusion 17 preferably has such a dimension as to ensure a cross-section endurable against a large load to be received from the rear crossbar 15. Specifically, the protrusion 17 preferably has stiffness satisfactorily avoiding deformation on contact with the rear crossbar 15 at the rear collision of the vehicle.

The contact surface 18 has a rear portion 18b including a rear end of the contact surface 18 and the front portion 18a including a front end of the contact surface 18 in the vehicular frontward and rearward direction X, and at least a part of the rear portion 18b is higher than the front portion 18a. Specifically, the rear portion 18b of the contact surface 18 gradually rises as advancing vehicular rearward X2 continuously from the front portion 18a. For instance, the height H1 of the rear end of the rear portion 18b of the contact surface 18, i.e., the height of the rear end of the rear portion 18b from a reference plane of the front portion 18a, is set to, for example, 2 to 10 mm (around 5 mm) as a height for deciding the rear crossbar 15 at a predetermined position while preventing the rear crossbar from displacing rearward X2 of the seat. This restricts displacement of the rear crossbar 15 rearward X2 when the rear crossbar 15 comes into contact with the contact surface 18 of the protrusion 17 at the rear collision of the vehicle.

More specifically, the rear portion 18b of the contact surface 18 gradually rises in an arc as advancing vehicular rearward X2. The arc of the rear portion 18b is such a shape or a curvature radius that the rear portion 18b comes into contact with the rear crossbar 15 having a columnar shape at a plurality of positions or come into surface contact therewith in a wide region. For instance, when an outer surface of the rear crossbar 15 has a curvature radius R2 of 12 to 13.5 mm (around 12.7 mm), the rear portion 18b has a curvature radius R1 set to 14 to 16.5 mm (around 15.7 mm). The setting makes a contact area of the outer surface of the rear crossbar 15 and the rear portion 18b of the contact surface 18 be large enough to distribute a load on the contact surface 18 when the rear crossbar 15 comes into contact with the contact surface 18 of the protrusion 17 at the rear collision of the vehicle.

The seat 1 having the above-described configuration ensures the gap between the rear crossbar 15 and the protrusion 17 in a state before the vehicle is involved in the rear collision and where the cushion frame 7 is in the second position, as shown in FIG. 2, FIG. 7, and FIG. 10A.

Figure 9:
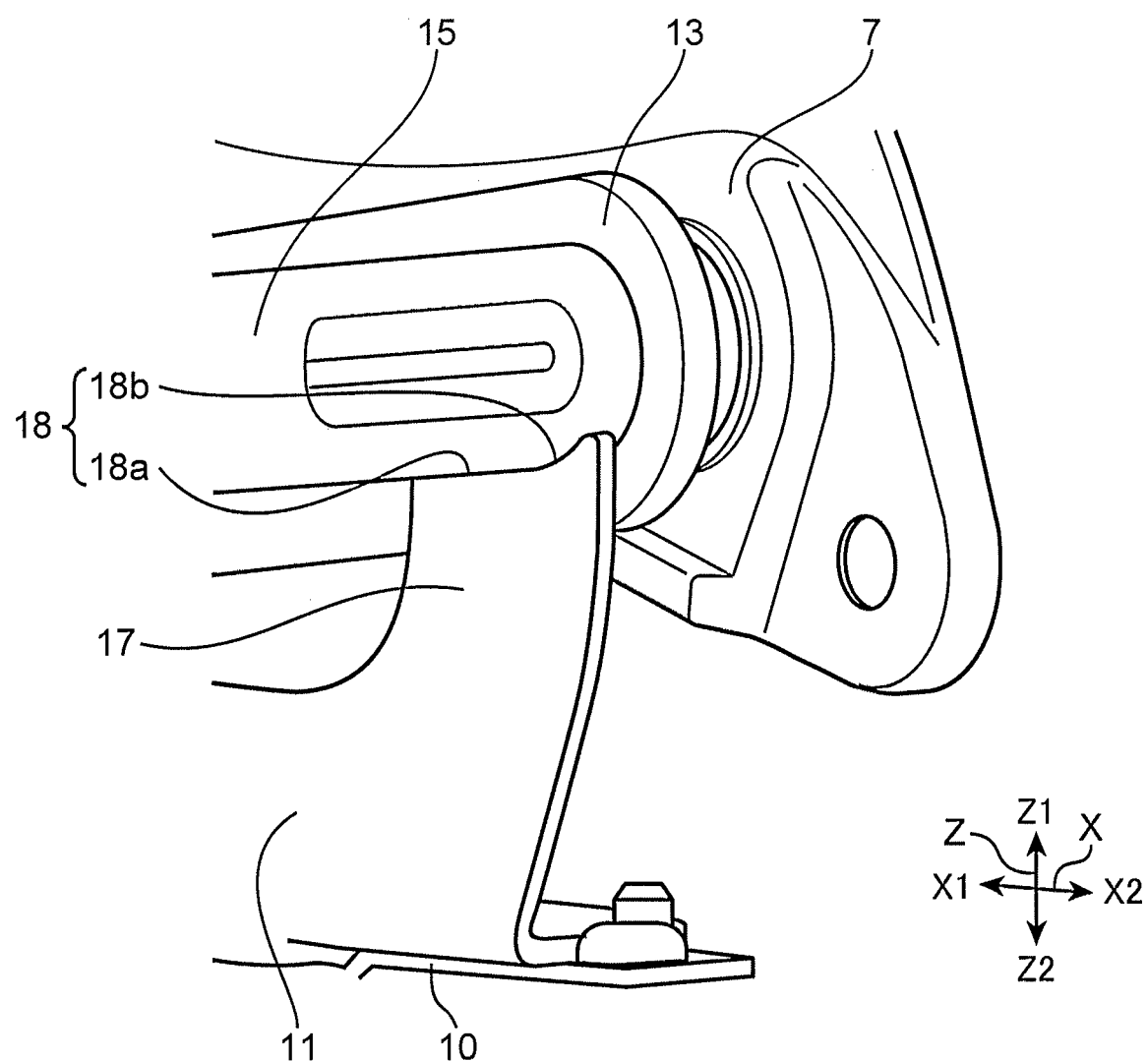
FIG. 9 is an enlarged perspective view of a state where the crossbar in FIG. 8 is in contact with the protrusion.

By contrast, when the vehicle is involved in the rear collision, the sitting person on the seat 1 is relatively moved rearward in the vehicle compartment in accordance with inertia, and the cushion frame 7 and the rear crossbar 15 serving as the bumping section move further downward Z2 from the second position in FIG. 7 by a force of the inertia. At this time, as shown in FIG. 8 to FIG. 9 and FIG. 10B, the rear crossbar 15 comes into contact with the contact surface 18 of the protrusion 17 to regulate a tilt angle of the rear link arm 13. This results in achieving prevention of the rearward tilting of the seat 1.

Characteristics of the Embodiment (1) A vehicle seat in the embodiment includes the seat cushion 2 contactable with the buttocks of a sitting person, and the link mechanism 6 configured to adjust a height of the seat cushion 2, as shown in FIG. 1 to FIG. 2. As shown in FIG. 2 to FIG. 6, the link mechanism 6 includes: the cushion frame 7 that supports the seat cushion 2; the pair of attachment brackets 11 to be directly or indirectly attached to a floor of a vehicle compartment; the pair of front link arms 12 and the pair of rear link arms 13 constituting a plurality of link arms linking the cushion frame 7 and each attachment bracket 11 to each other in such a manner that the cushion frame 7 is shiftable between the first position and the second position located downward Z2 and vehicular rearward X2 of the first position in parallel to the pair of attachment brackets 11; a rear crossbar 15 serving as the bumping section constituting a part of the cushion frame 7; and the protrusions 17.

Each protrusion 17 is integrally formed with corresponding one of the pair of attachment brackets 11 and protrudes upward Z1 from the upper surface 11d of the attachment bracket 11 (see FIG. 4 to FIG. 6), and has the contact surface 18 that comes into contact with the rear crossbar 15 thereon when a vehicle is involved in a rear collision.

In this configuration including the link mechanism 6 configured to adjust the height of the seat cushion 2, the link mechanism 6 includes the pair of attachment brackets 11 to be attached to the floor of the vehicle compartment, each of attachment brackets being integrally formed with the corresponding protrusion 17 extending upward Z1.

As shown in FIG. 7 to FIG. 9, the protrusion 17 comes into contact with the rear crossbar 15 serving as the bumping section constituting a part of the cushion frame 7 on the contact surface 18 of the protrusion 17 when the seat tilts rearward at a vehicle collision, and the contact enables regulation of a tilt angle of the rear link arm 13. Consequently, the direct contact of the rear crossbar 15 fixedly attached to the cushion frame 7 with the attachment bracket 11 having an enough strength to receive a load eliminates the necessity of additionally providing another member (i.e., another member like a conventional stop element) for receiving the load independently of the link mechanism 6. This results in achieving prevention from rearward tilting of the seat at a rear collision and prevention from an increase in the weight of the seat.

In other words, the seat 1 in the embodiment has a structure in which the existing attachment bracket 11 of the link mechanism 6 is provided with the protrusion 17 for receiving a load at a rear collision. That is, the portion already existing and having a satisfactory strength is configured to receive the load, and thus, no additional structure or reinforcement is needed. This leads to suppression of an incurring cost accompanied by the additional structure or reinforcement.

Even in a case where an attachment bracket has no protrusion 17 like the one described above in an already existing link mechanism, replacement with an attachment bracket 11 having a protrusion 17 or replacement with another attachment bracket 11 having a protrusion 17 with a different height facilitates addition of functionality of regulating a tilt angle of the rear link arm 13 at a later stage.

(2) In the vehicle seat in the embodiment, the rear crossbar 15 rotatably supports the pair of rear link arms 13, as shown in FIG. 2, FIG. 7 to FIG. 8, FIG. 10A and FIG. 10B. The contact surface 18 has such a height H0 (see FIG. 6) that the contact surface 18 is near to the rear crossbar 15 in the state where the cushion frame 7 is in the second position.

In this configuration, the protrusion 17 of the attachment bracket 11 comes into contact with the rear crossbar 15 at a position further closer to a seat surface (i.e., closer to an upper surface of the seat cushion 2) to receive a load from the rear crossbar 15 when the vehicle is involved in a rear collision, and thus, a variation in tilt angles of the rear link arm 13 attributed to deformation of the seat is easily suppressed. Besides, increasing extension of the protrusion 17 upward Z1 is adaptable to a seat having a seat surface at a higher position, so that the seat also achieves suppression of a variation in tilt angles of the rear link arm 13.

In other words, the protrusion 17 arranged to be contactable with the rear crossbar 15 serving as a rotation pin of the rear link arm 13 on the cushion frame 7 side at a rear collision of the vehicle receives a load at a position much closer to the seat surface and further closer to a load input point. The configuration succeeds in smaller deformation of the seat 1 than a configuration of receiving a load at a distant location from a load input point. This consequently achieves suppression of a variation in tilt angles of the rear link arm 13. The embodiment is directed to the structure that the protrusion extends upward Z1 from the attachment bracket 11 attached to the upper rail 10 of the guide rail 5, and thus is also easily applicable to even a seat structure including a cushion frame 7 located at a higher position from the guide rail 5 by increasing extension of a protrusion 17.

In a case where a regulation part (corresponding to the protrusion 17 in the embodiment) that regulates a tilt angle of a link at reward tilting thereof is provided closer to the link like a conventional seat (e.g., the seat disclosed in Japanese Patent Publication No. 5866159), increasing extension of the regulation part upward in accordance with an increase in the distance between the guide rail 5 and the cushion frame 7 may make the regulation part interfere with another component. Moreover, it is necessary to additionally provide another structure to come into contact with the regulation part when using the link without any change thereto. By contrast, in the seat in the embodiment, the protrusion 17 provided to the attachment bracket 11 of the link mechanism 6 may make a distance between the guiderail 5 and the cushion frame 7 be longer, but the height of the protrusion 17 is easily changeable to be suited to the longer distance.

(3) In the vehicle seat in the embodiment, the height H0 of the contact surface 18 is preferably set in such a manner as to define a gap between the contact surface 18 and the rear crossbar 15 in the state where the cushion frame 7 is in the second position.

In normal use of the vehicle except for a rear collision of the vehicle, this configuration reliably avoids contact between the contact surface 18 of the protrusion 17 and the rear crossbar 15 serving as the bumping section of the cushion frame 7 in the state where the cushion frame 7 is in the second position. This prevents an occurrence of a noise attributed to contact between the contact surface 18 and the rear crossbar 15 in running of the vehicle.

(4) In the vehicle seat in the embodiment, the link mechanism 6 further includes the reinforcement plate member 16 fixedly attached to a connection portion of the rear link arm 13 and the rear crossbar 15 to reinforce the rear link arm 13, as shown in FIG. 2 to FIG. 5.

The contact surface 18 of the protrusion 17 has such a length L1 (see FIG. 6) in the vehicular frontward and rearward direction X as to come into contact with the rear crossbar 15 and the reinforcement plate member 16 at the same time.

This configuration enables the contact surface 18 to receive a load from the reinforcement plate member 16 as well as the load from the rear crossbar 15 by ensuring a large region of the contact surface 18 of the protrusion 17 in the vehicular frontward and rearward direction X, and thus prevents the loads at a rear collision from concentrating in a specific portion on the contact surface 18.

(5) In the vehicle seat according to the embodiment, the bumping section of the cushion frame 7 includes the rear crossbar 15 extending in the width direction Y of the seat.

As shown in FIG. 2, FIG. 7 to FIG. 8, FIG. 10A and FIG. 10B, the pair of protrusions 17 are provided and spaced apart from each other in the width direction Y on both sides of the seat 1 in the width direction Y. The pair of protrusions 17 fall within an inner range of the cushion frame 7 in the width direction Y.

This configuration enables the pair of protrusions 17 to reliably come into contact with the rear crossbar 15 even when the seat deforms in the width direction Y due to the arrangement of the protrusions 17 in the inner side of the cushion frame 7 in the width direction Y, and achieves suppression of the deformation of the seat in the width direction Y.

This configuration further enables the pair of protrusions 17 to reliably receive the rear crossbar 15 even in the deformation of the seat in the width direction Y (see FIG. 10B), and achieves suppression of the deformation of the seat 1 in the width direction Y by contact between a side surface of the corresponding protrusion 17 and the cushion frame 7, the rear link arm 13, or other constituent member.

Here, a conventional seat structure, for example, a conventional seat structure that regulates rearward tilting of the seat and restricts displacement in a seat width direction (e.g., a structure having an abutting portion at a link and a restrictor at a bracket, described in Japanese Patent Publication No. 6838492) has a possibility that the abutting portion may fail to come into contact with the restrictor at a predetermined position in significant displacement in the seat width direction, and thus fail to regulate the rearward tilting and restrict the displacement in the seat width direction. By contrast, the seat in the embodiment provides the protrusions 17 that regulate such rearward tilting inside the cushion frame 7 in the width direction Y to ensure contact between the rear crossbar 15 and the pair of protrusions 17 regardless of any deformation of the seat in the width direction Y, and thus achieves regulation of the rearward tilting of the seat. Moreover, contact of the protrusion with the cushion frame 7, the rear link arm 13, or other member in addition to the rear crossbar 15 may ensure regulation of the position of the cushion frame 7 and restriction of displacement in the width direction Y.

(6) In the vehicle seat in the embodiment, as shown in FIG. 5 to FIG. 6 and FIG. 9, the contact surface 18 has the rear portion 18b including the rear end of the contact surface 18 and the front portion 18a including the front end of the contact surface 18 in the vehicular frontward and rearward direction X, and at least a part of the rear portion is higher than the front portion. Specifically, the rear portion 18b of the contact surface 18 gradually rises as advancing vehicular rearward X2.

This configuration decides the rear crossbar 15 at a predetermined position on contact with the protrusion 17 regardless of a variation in tilt angles and front-rear positions of the rear link arm 13 on both the left and right sides of the seat in the width direction Y. The contact surface 18 can receive the rear crossbar 15 at a plurality of positions, and thus can distribute the load applied at a rear collision in a wide region of the contact surface 18.

Setting the rear portion 18b of the contact surface 18 of the protrusion 17 at a position relatively higher than the front portion 18a enables decision of the rear crossbar 15 at the predetermined position by absorbing a variation in displacement of the rear crossbar 15 in the vehicular frontward and rearward direction X.

Here, in a structure, like a conventional seat of Japanese Patent Publication No. 5866159, in which an inner surface of an arc recess formed in a link arm and an outer surface of a columnar crossbar fixedly attached to the cushion frame come into contact with each other, the respective contact surfaces of the link arm and the crossbar extend in an arc in parallel to each other. This configuration requires a wide region in the arc recess serving as a receiving section to absorb a variation in positions of the contact surfaces relative to each other. By contrast, in the seat in the embodiment, the rear portion of the contact surface 18 of the protrusion 17 is defined to be at a relatively high position to absorb a variation in displacement of the rear crossbar 15 and enable decision of the rear crossbar 15 at the predetermined position.

(7) In the vehicle seat in the embodiment, as shown in FIG. 5 to FIG. 6, the rear portion 18b of the contact surface 18 gradually rises in an arc as advancing vehicular rearward X2

This configuration attains an increase a contact area between the rear crossbar 15 and the contact surface 18, resulting in preventing each contact surface of the protrusion 17 and the rear crossbar 15 (i.e., each of the contact surface 18 of the protrusion 17 and an outer surface of the rear crossbar 15) from being damaged.

More specifically, the rear portion 18b of the contact surface 18 gradually rises in an arc from an intermediate portion of the contact surface 18 to increase the contact area with the rear crossbar 15, resulting in preventing the load from concentrating at a specific point on the contact surface 18.

(8) In the vehicle seat in the embodiment, the attachment bracket 11 of the link mechanism 6 has the rear support part 11b rotatably supporting the lower portion of the rear link arm 13. Hence, the rear support part 11b and the protrusion 17 are integrally formed to constitute a part of the attachment bracket 11.

In this manner, the attachment bracket 11 solely restricts the upper and lower portions of the rear link arm 13 at the same time at a rear collision. In other words, the rear support part 11b of the attachment bracket 11 restricts the lower portion of the rear link arm 13 and the protrusion 17 restricts the upper portion of the rear link arm 13 via the rear crossbar 15. This reliably suspends the rear link arm 13 and the cushion frame 7 connected thereto from moving vehicular rearward X2.

Modifications (A) Although the rear crossbar 15 is exemplarily described as the bumping section to come into contact with the protrusion 17 integrally formed with the attachment bracket 11 of the link mechanism 6 in the embodiment, the present invention is not limited thereto. The bumping section of the present invention is only required to constitute a part of the cushion frame 7, and thus may be another section of the cushion frame 7 in place of the rear crossbar 15. For instance, the front crossbar 14 in the cushion frame 7 may serve as the bumping section. In this case, the protrusion 17 can come into contact with the front crossbar 14 when a vehicle is involved in a rear collision as long as the protrusion 17 protrudes upward Z1 from an upper surface of the attachment bracket 11 within a range from the front support part 11a to the rear support part 11b of the attachment bracket 11 shown in FIG. 2.

(B) Although the protrusion 17 has stiffness satisfactorily avoiding deformation on contact with the rear crossbar 15 at a rear collision of the vehicle in the embodiment, the protrusion 17 may buckle to absorb an impact of a severer rear collision and alleviate the impact to be transferred onto the sitting person.

For instance, the height of the protrusion 17 is increased to support the rear crossbar 15 located rearward X2 of the rear link arm 13. The increased height may be utilized to absorb an impact through the buckling at the severer collision.

Figure 11:
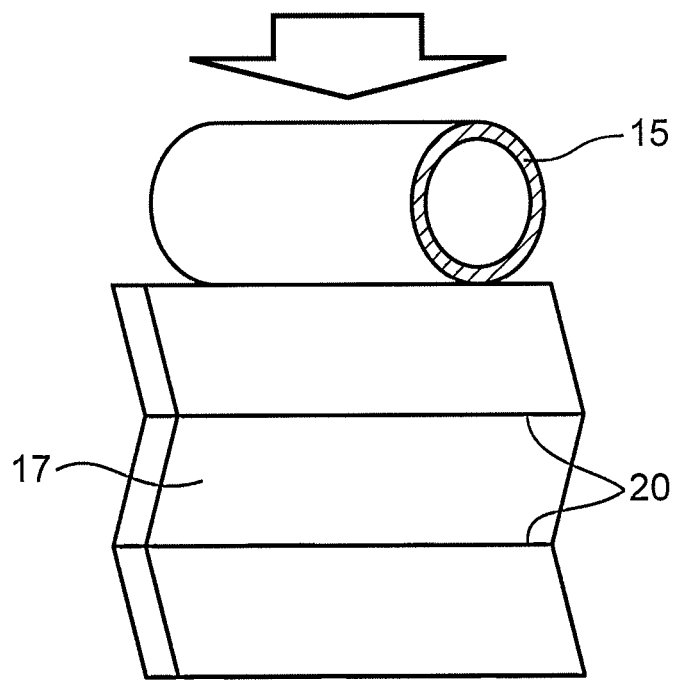
FIG. 11 is an explanatory view showing a modification of the seat of the present invention and showing an example of a protrusion provided with a fold to easily buckle.
Figure 12:
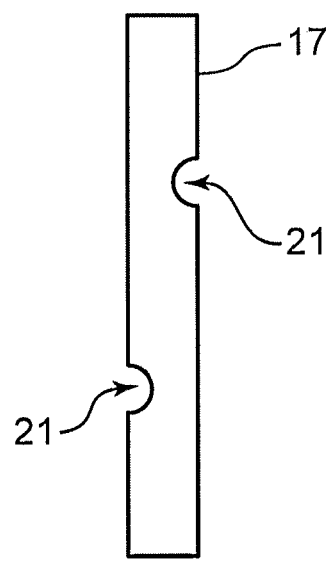
FIG. 12 is an explanatory view showing another modification of the seat of the present invention and showing an example of a protrusion having a groove so that the protrusion is easily folded.
Figure 13:
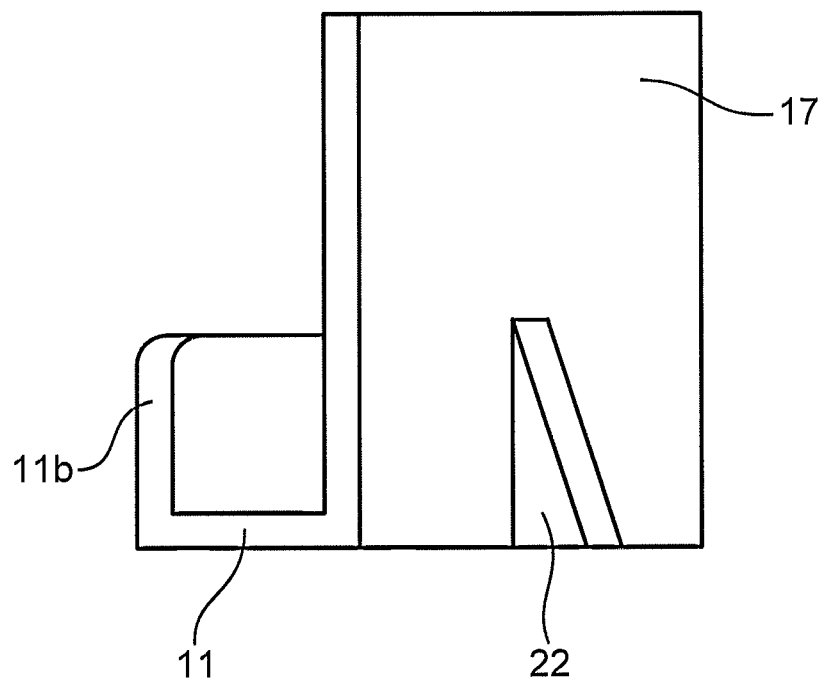
FIG. 13 is an explanatory view showing still another modification of the seat of the present invention and showing an example of a protrusion provided with a rib to give reinforcement.

The protrusion 17 may have a fold 20 as shown in FIG. 11 or a groove 21 as shown in FIG. 12 so that the protrusion 17 reliably deforms at an estimated load or greater to absorb the impact. Each of the fold 20 and the groove 21 enables the protrusion 17 to intentionally buckle to absorb the impact more effectively than unintentional buckling of the protrusion.

A reinforcement section, such as a rib 22 or a bead, may be added when the height of the protrusion 17 is considered insufficient to endure an estimative load at a rear collision.

Summary of Embodiment

The embodiment is summarized in the following manner.

A vehicle seat in the embodiment includes: a seat cushion; and a link mechanism configured to adjust a height of the seat cushion. The link mechanism includes: a cushion frame that supports the seat cushion; an attachment bracket to be directly or indirectly attached to a floor of a vehicle compartment; a plurality of link arms linking the cushion frame and the attachment bracket to each other in such a manner that the cushion frame is shiftable between a first position and a second position located downward and vehicular rearward of the first position in parallel to the attachment bracket; and a protrusion integrally formed with the attachment bracket and protruding upward from an upper surface of the attachment bracket, and having a contact surface that comes into contact with a bumping section constituting a part of the cushion frame thereon when a vehicle is involved in a rear collision.

In this configuration including the link mechanism configured to adjust the height of the seat cushion, the link mechanism includes the attachment bracket to be attached to the floor of the vehicle compartment, and the attachment bracket being formed with the protrusion extending upward. The protrusion comes into contact with the bumping section constituting a part of the cushion frame on the contact surface of the protrusion when the seat tilts rearward at a vehicle collision, and this contact enables regulation of a tilt angle of the link arm. Consequently, the direct contact of the bumping section fixedly attached to the cushion frame with the attachment bracket having an enough strength to receive a load eliminates the necessity of additionally providing another member (i.e., another member like a conventional stop element) for receiving the load independently of the link mechanism. This results in achieving prevention from rearward tilting of the seat at a rear collision and prevention from an increase in the weight of the seat.

In the vehicle seat, preferably, the bumping section rotatably supports a link arm, and the contact surface has such a height that the contact surface is near to the bumping section in a state where the cushion frame is in the second position.

In this configuration, the protrusion of the attachment bracket comes into contact with the bumping section at a position further closer to a seat surface (i.e., closer to an upper surface of the seat cushion) to receive a load from the bumping section when the vehicle is involved in a rear collision, and thus, variation in tilt angles of the rear link arm attributed to deformation of the seat is easily suppressed. Besides, increasing extension of the protrusion upward is adaptable to a seat having a seat surface at a higher position, so that the seat also achieves suppression of a variation in tilt angles of the rear link arm.

In the vehicle seat, preferably, the height of the contact surface is set in such a manner as to define a gap between the contact surface and the bumping section in the state where the cushion frame is in the second position.

In normal use of the vehicle except for a rear collision of the vehicle, this configuration reliably avoids contact between the contact surface of the protrusion and the bumping section of the cushion frame in the state where the cushion frame is in the second position. This prevents an occurrence of a noise attributed to contact between the contact surface and the bumping section in running of the vehicle.

In the vehicle seat, preferably, the link mechanism further includes a reinforcement plate member fixedly attached to a connection portion of the link arm and the bumping section to reinforce the link arm, and the contact surface of the protrusion has such a length in a vehicular frontward and rearward direction as to come into contact with the bumping section and the reinforcement plate member at the same time.

This configuration enables the contact surface to receive a load from the reinforcement plate member as well as the load from the bumping section by ensuring a large region of the contact surface of the protrusion in the vehicular frontward and rearward direction, and thus prevents the loads at a rear collision from concentrating in a specific portion on the contact surface.

In the vehicle seat, preferably, the bumping section includes a crossbar extending in a width direction of the seat, and a pair of the protrusions are provided and spaced apart from each other in the width direction, and fall within an inner range of the cushion frame in the width direction.

This configuration enables the pair of protrusions to reliably come into contact with the crossbar even when the seat deforms in the width direction due to the arrangement of the protrusions in the inner side of the cushion frame in the width direction, and achieves suppression of further deformation of the seat in the width direction.

In the vehicle seat, preferably, the contact surface has a rear portion including a rear end of the contact surface and a front portion including a front end of the contact surface in a vehicular frontward and rearward direction, and at least a part of the rear portion is higher than the front portion.

This configuration decides the bumping section at a predetermined position on contact with the protrusion regardless of a variation in tilt angles and front-rear positions of the link arm on both the left and right sides of the seat in the width direction. The contact surface can receive the bumping section at a plurality of positions, and thus can distribute the load applied at the rear collision in a wide region of the contact surface.

In the vehicle seat, preferably, the rear portion of the contact surface gradually rises in an arc as advancing vehicular rearward.

This configuration attains an increase a contact area between the bumping section and the contact surface, resulting in preventing each contact surface of the protrusion and the rear crossbar from being damaged.

Conclusively, the seat in the embodiment can be prevented from rearward tilting of the seat at a rear collision and prevented from an increase in the weight of the seat.

The invention claimed is:

1. A vehicle seat, comprising:
a seat cushion; and
a link mechanism configured to adjust a height of the seat cushion, wherein
the link mechanism includes:
a cushion frame that supports the seat cushion;
an attachment bracket to be directly or indirectly attached to a floor of a vehicle compartment;
a plurality of link arms linking the cushion frame and the attachment bracket to each other in such a manner that the cushion frame is shiftable between a first position and a second position located downward and vehicular rearward of the first position in parallel to the attachment bracket; and
a protrusion integrally formed with the attachment bracket and protruding upward from an upper surface of the attachment bracket, and having a contact surface that comes into contact with a bumping section constituting a part of the cushion frame thereon when a vehicle is involved in a rear collision,
wherein the bumping section includes a crossbar extending in a width direction of the seat, and
a pair of the protrusions are provided and spaced apart from each other in the width direction, and fall within an inner range of the cushion frame in the width direction.

2. The vehicle seat according to claim 1, wherein the bumping section rotatably supports a link arm, and
the contact surface has such a height that the contact surface is near to the bumping section in a state where the cushion frame is in the second position.

3. The vehicle seat according to claim 2, wherein the height of the contact surface is set in such a manner as to define a gap between the contact surface and the bumping section in the state where the cushion frame is in the second position.

4. The vehicle seat according to claim 2, wherein the link mechanism further includes a reinforcement plate member fixedly attached to a connection portion of the link arm and the bumping section to reinforce the link arm, and
the contact surface of the protrusion has such a length in a vehicular frontward and rearward direction as to come into contact with the bumping section and the reinforcement plate member at the same time.

5. The vehicle seat according to claim 1, wherein the contact surface has a rear portion including a rear end of the contact surface and a front portion including a front end of the contact surface in a vehicular frontward and rearward direction, and at least a part of the rear portion is higher than the front portion.

6. The vehicle seat according to claim 5, wherein the rear portion of the contact surface gradually rises in an arc as advancing vehicular rearward.

7. The vehicle seat according to claim 3, wherein the link mechanism further includes a reinforcement plate member fixedly attached to a connection portion of the link arm and the bumping section to reinforce the link arm, and
the contact surface of the protrusion has such a length in a vehicular frontward and rearward direction as to come into contact with the bumping section and the reinforcement plate member at the same time.

8. The vehicle seat according to claim 2, wherein the contact surface has a rear portion including a rear end of the contact surface and a front portion including a front end of the contact surface in a vehicular frontward and rearward direction, and at least a part of the rear portion is higher than the front portion.

9. The vehicle seat according to claim 3, wherein the contact surface has a rear portion including a rear end of the contact surface and a front portion including a front end of the contact surface in a vehicular frontward and rearward direction, and at least a part of the rear portion is higher than the front portion.

* * * * *